United States Patent [19]

Mukohjima et al.

[11] Patent Number: 5,264,753
[45] Date of Patent: Nov. 23, 1993

[54] SUPPORTING DEVICE FOR VIBRATION WAVE DRIVEN MOTOR

[75] Inventors: Hitoshi Mukohjima, Fukuoka; Hirokazu Hashizume, Tokyo, both of Japan

[73] Assignee: Canon Kabushiki Kaisha, Japan

[21] Appl. No.: 810,904

[22] Filed: Dec. 20, 1991

[30] Foreign Application Priority Data

Dec. 25, 1990 [JP] Japan .................. 2-405834

[51] Int. Cl.$^5$ .......................... H01L 41/08
[52] U.S. Cl. .......................... 310/323
[58] Field of Search .................. 310/323, 352, 353

[56] References Cited

U.S. PATENT DOCUMENTS

| | | | |
|---|---|---|---|
| 3,906,249 | 9/1975 | Gilbert et al. | 310/352 |
| 4,025,806 | 5/1977 | Weber | 310/352 |
| 4,104,553 | 8/1978 | Eigdahl et al. | 310/352 |
| 4,410,827 | 10/1983 | Kogure | 310/352 |
| 4,634,915 | 1/1987 | Mukoujima et al. | 310/323 |
| 4,649,311 | 3/1987 | Mukoujima et al. | 310/323 |
| 5,017,823 | 5/1991 | Okumura | 310/323 |

FOREIGN PATENT DOCUMENTS

| | | |
|---|---|---|
| 0360199 | 3/1990 | European Pat. Off. . |
| 60-096183 | 5/1985 | Japan . |
| 62-213585 | 9/1987 | Japan . |
| 0136983 | 6/1988 | Japan .................. 310/323 |
| 0084079 | 3/1990 | Japan .................. 310/348 |

Primary Examiner—Steven L. Stephan
Assistant Examiner—C. LaBalle
Attorney, Agent, or Firm—Fitzpatrick, Cella, Harper & Scinto

[57] ABSTRACT

A supporting device supports a vibrating body or contacting member at one or plural locations in a vibration wave driven motor in which the aforesaid vibrating body is caused to generate traveling waves when an alternating current is applied to the electromechanical energy transducing element connected to the vibrating body thereby to move relatively the aforesaid vibrating body and the contacting member being in contact therewith under pressure. This supporting device is provided with a first supporting member which extends in the direction substantially perpendicular to the traveling direction of the traveling vibration wave, one end of which is coupled to the aforesaid vibrating body or contacting member, and a second supporting member which extends in the traveling direction of the traveling vibration wave, one end of which is coupled to the other end of the aforesaid first supporting member and the other end of which is connected to a fixing portion, thus making it possible to support the vibration wave driven motor reliably without any loss of vibrating energy.

9 Claims, 5 Drawing Sheets

SUPPORTING DEVICE FOR VIBRATION WAVE DRIVEN MOTOR

BACKGROUND OF THE INVENTION

1. Field of the Invention

The present invention relates to a vibration wave driven motor which causes a vibrating body and a member in contact with the aforesaid vibrating body to exert relative motion by the traveling vibration wave generated by the vibrating body. More particularly, the invention relates to a supporting device capable of supporting the vibrating body to be fixed to fixing members without any interference to its vibration.

2. Related Background Art

The vibration wave driven motor which utilizes traveling vibration waves has been in practical use recently, and the summary of its principle is given below.

To one face of a resilient ring type vibrating body having a total perimeter such as a certain length $\lambda$ times an integral number, there are fixed two groups of plural piezoelectric elements (hereinafter referred to as piezoelectric element group A and piezoelectric element group B) arranged in the peripheral direction to form a stator. These piezoelectric elements are arranged in each of the groups A and B at pitches of $\lambda/2$ with alternately inverted stretches. Also, there is arranged a deviation of $\lambda/4$ times an odd number between the groups A and B. For both of the A and B group piezoelectric elements, electrode films are provided respectively. When an alternating current voltage is applied to either one of the groups, i.e , only to the A group, for example, there is generated in the above-mentioned vibrating body along the total periphery thereof the standing wave of an out-of-plane vibration ((wavelength $\lambda$) hereinafter referred to as standing wave A) which is a flexural vibration having antinode positions in the central portions of each of the piezoelectric elements in the aforesaid group A and at every other point $\lambda/2$ away therefrom as well as node positions in the central points between the aforesaid antinode positions. Then, when the AC voltage is applied only to the group B, there is likewise generated a standing wave (hereinafter referred to as standing wave B). However, the antinode and node positions thereof are deviated by $\lambda/4$ with respect to the aforesaid standing wave A. If an AC voltage of same frequency with time phase difference of $\pi/4$ is applied to both of the groups A and B simultaneously, then a flexural vibration having a traveling wave (wavelength $\lambda$) which travels in the circumferential direction is generated as a result of the synthesis of the two standing waves. At this juncture, each of the points on the other face of the above-mentioned vibrating body which has a thickness is caused to create a kind of elliptic motion. Therefore, if a ring type movable member (rotor) is allowed to be in contact under pressure with the aforesaid other face of the vibrating body, then this movable member receives friction from the vibrating body in its circumferential direction so that it is driven to rotate The rotational direction thereof can be reversed by switching the phase difference of the AC voltage applied to both of the piezoelectric element groups A and B positive to negative. This has been the summary of the principle of a vibration wave driven motor of the kind.

On the other hand, it is not easy to fix the vibrating body for supporting the traveling vibration wave driven motor because there is no point in the vibrating body which is not displaced, i.e., there is no node of the vibration therein. Accordingly, the vibrating body is fixed to a fixing member through a flexible material such as felt.

Also, there is proposed a structure whereby to support the vibrating body by providing an auxiliary vibrating element such as disclosed in Japanese Patent Laid-Open Application No. 60-96183.

Furthermore, as disclosed in Japanese Patent Laid-Open Application No. 2-84079, a structure has been proposed in which a vibrating body is coupled by mounting members having an interval corresponding to $\{(\lambda/2)+n\lambda\}$ (where n is an integer including zero).

Nevertheless, with the conventional supporting structure such as using felt or other flexible materials, it is impossible to position the vibrating body accurately. Also, there is a disadvantage that the vibration insulation effect is reduced due to changes associated with the elapse of time, etc. Besides, it is almost impossible to support the reaction of the driving power although the pressure given to the rotor can be supported. As a result, it becomes necessary to provide another member such as disclosed in Japanese Patent Laid-Open Application No. 62-213585 in order to support the reaction exerted by the driving.

Also, in the supporting structure using the auxiliary vibrating element as disclosed in Japanese Patent Laid-Open Application No. 60-96183, it is necessary to make the length of the auxiliary vibrating element constant in the direction at right angles to the traveling direction of the traveling wave of the vibrating body. Accordingly, this occupies a large space, leading to a disadvantage that the total volume of the motor becomes great.

Also, for the structure whereby to couple the vibrating body by the mounting members having an interval corresponding to $\{(\lambda/2)+n\lambda\}$ to support it fixedly at its intermediate point as disclosed in Japanese Patent Laid-Open Application No. 2-84079, it is necessary to make its shape long and narrow, and to make it complicated to absorb the torsional stress of the coupling axis between them caused by the traveling wave. Furthermore, it is necessary for the beam portion of the mounting members to be in a motion close to rigidity. In this case, therefore, there is also a disadvantage that the dimension of the beam portion becomes great in practice because the driving frequency is usually as high as 20 KHz (in order to avoid the audible range).

SUMMARY OF THE INVENTION

It is an object of the present invention to provide a supporting device for a vibration wave driven motor capable of supporting the vibrating body with respect to the fixing member in a simple structure without making it large as well as without hindering the vibration of the vibrating body.

The above-mentioned and other objectives, features, and advantages of the present invention will become more apparent by reference to the detailed description thereof set forth below One aspect of the present invention is that in a supporting device for supporting a vibrating body or contacting member at one or plural locations in a vibration wave driven motor where the aforesaid vibrating body is caused to generate traveling waves by applying an alternating electric field to the electromechanical energy transducing element which is connected to the vibrating body thereby to move relatively the aforesaid vibrating body and the contacting member which is in contact under pressure with the aforesaid vibrating body, the supporting device of the present invention includes a first supporting member which extends in the direction substantially perpendicular to the traveling direction of the traveling vibration wave, one end of which is coupled to the aforesaid vibrating body or contacting member, and a second supporting member which extends in the traveling direction of the traveling vibration wave, and one end of which is coupled to the other end of the aforesaid first supporting member and the other end of which is connected to a fixing portion.

DESCRIPTION OF THE PREFERRED EMBODIMENTS

Figure 1:
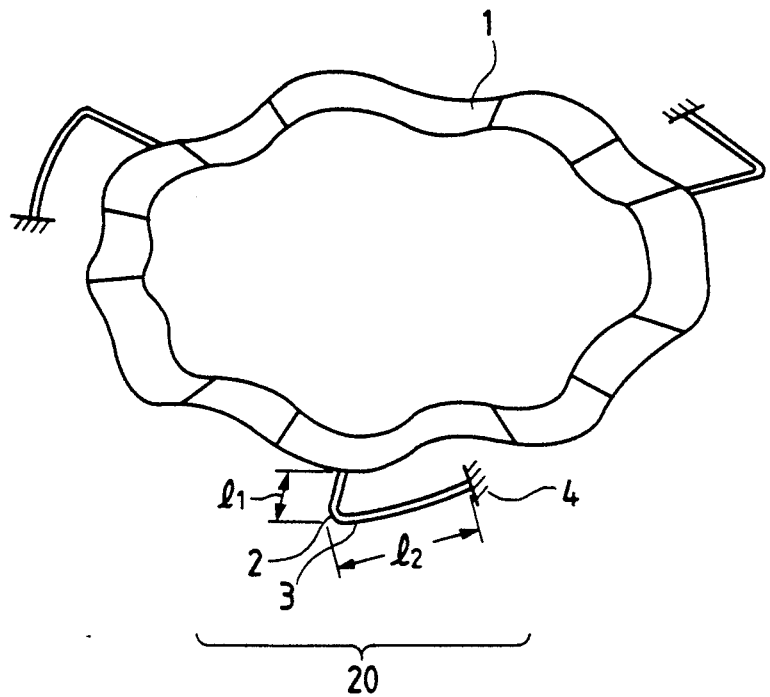
FIG. 1 is a schematic view illustrating a first embodiment of the supporting device for a vibration wave driven motor according to the present invention.
Figure 2:
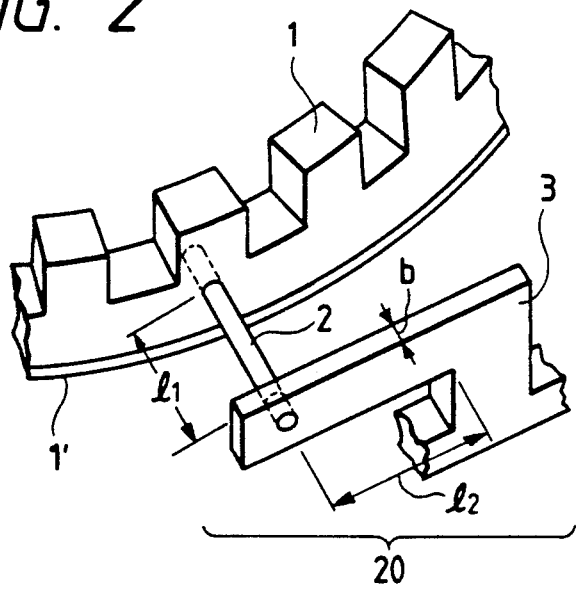
FIG. 2 is a partial enlargement of the supporting device shown in FIG. 1.

FIG. 1 is a perspective view schematically illustrating a first embodiment of the supporting device for a vibration wave driven motor according to the present invention and FIG. 2 is a perspective view showing the detail thereof. In this respect, what differs from the known vibration wave driven motor will be referred to in the description set forth below.

Supporting devices 20 according to the present embodiment are arranged to support the known circular vibrating body 1, which is vibrated by the traveling wave having a wavelength $\lambda$, at three locations as shown in FIG. 1, and the devices are respectively provided on the outer periphery of the vibrating body 1.

The vibrating body 1 is arranged to obtain a strong driving force by lowering the position of the neutral axis of vibration, for example, with the formation of plural projections on the side which is in contact with the known traveling body 1A (FIG. 4), and on the opposite face of the projective surface, the known piezoelectric element 1' is bonded by adhesives. Then, by applying the known AC voltage to the two-phase piezoelectric element group formed on this piezoelectric element 1', the vibrating body 1 is caused to generate an out-of-plane mode traveling wave with a wavelength $\lambda$ in the circumferential direction. A reference numeral 2 designates a first supporting member which extends from the end face of the vibrating body 1 in the direction at right angles or almost right angles to the traveling direction of the traveling wave. In the present embodiment, the supporting member is of a resilient rod type having an effective length $l_1$. This effective length $l_1$ is defined to be a length thereby to allow the first supporting member to vibrate following the torsional displacement of the vibrating body 1. A reference numeral 3 designates a second supporting member which is connected to the rod type resilient member 2 having an effective length of $l_2$ extending in parallel or almost in parallel with the traveling direction of the traveling wave generated in the vibrating body 1, and the other end thereof is fixed to a fixing section 4. This length $l_2$ is defined to be a length thereby to allow the second supporting member to vibrate following the amplitude of the traveling wave as well as the torsion of the first supporting member around its axis at the connecting portion of the first supporting member and second supporting member. In this respect, if the first supporting member does not satisfy the aforesaid conditions due to its rigidity, for example, the aforesaid second body should be able to satisfy the aforesaid conditions and the aforesaid conditions required for the first supporting member as well. In other words, it is then necessary to define the length of the second supporting member so as to allow it to vibrate following the torsion displacement of the vibrating body 1.

In the present embodiment, the operation is performed to support the device by the utilization of the resilient deformation of the first and second supporting members 2 and 3 without producing any adverse effect on the traveling wave. Hereinafter, the description will be made thereof separately according to the functions represented by the first and second supporting members In this respect, the details of the principle will also be described hereunder.

Figure 3:
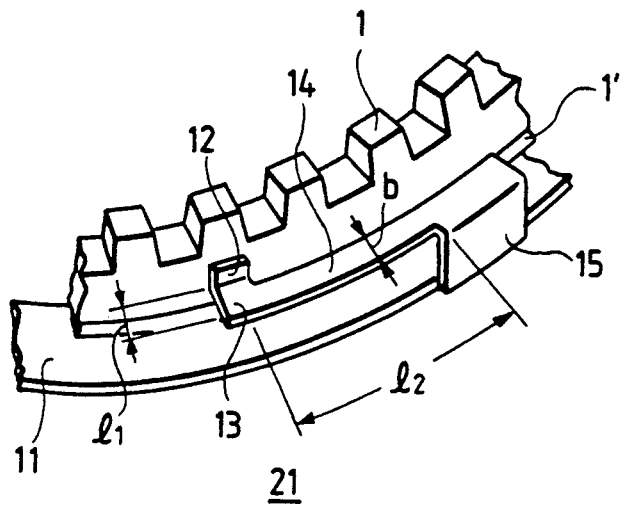
FIG. 3 is a partial enlargement of a second embodiment of the supporting device.
Figure 4:
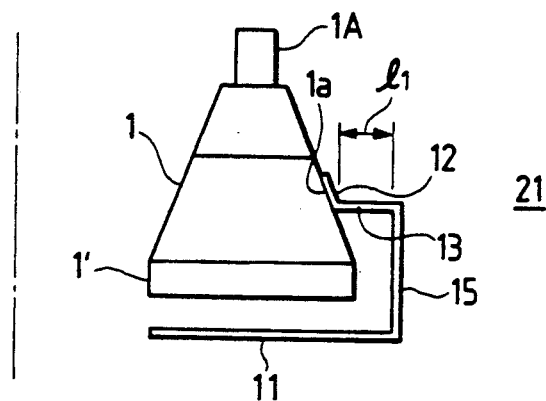
FIG. 4 is a cross-sectional view of the supporting device shown in FIG. 3.
Figure 5:
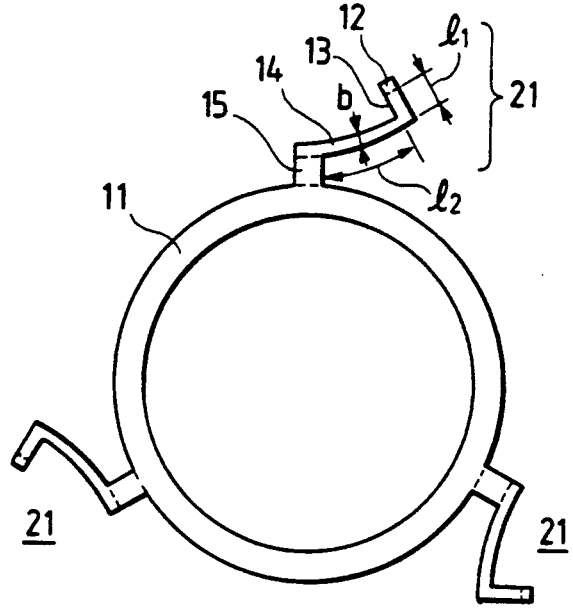
FIG. 5 is a plan view showing the supporting device shown in FIG. 3.

Now that the structure becomes much simpler if the first and second supporting members are integrated rather than separately constructed such as above, FIG. 3 illustrates a second embodiment according to the present invention. FIG. 4 is a cross-sectional view illustrating the junction of the supporting member and vibrating body. FIG. 5 is a plan view showing the supporting member.

At first, as shown in FIG. 5, the supporting member is produced from a plate by a press or other machining and formed by bending the portions indicated by broken lines in FIG. 5. The supporting member 21 is constructed by a set of three similar members of a circular arc type, which are integrally coupled by a base 11. A reference numeral 13 designates a first supporting member corresponding to the first supporting member 2 shown in FIG. 2; 14, a second supporting member corresponding to the second supporting member 3 shown in FIG. 2; and 11 and 15, fixing portions. Then, to the outer periphery 1a of the vibrating body 1 having a trapezoidal cross-section, the supporting member coupling portion 12 formed by bending the leading end of the first supporting member 13 is connected. This coupling method is implemented by a bonding, spot welding, laser welding, or the like.

The vibration of the traveling wave of this supporting member 21 conforms to the bending vibration equation provide that the cross-sectional shape is constant and the length $l$ is sufficiently long with respect to the thickness. It is well known that the length $l$ is generally expressed by the equation (1) given below if it is reduced by the boundary conditions at both ends.

$$l = \beta \left( \frac{EI}{PA\omega^2} \right)^{1/4} \quad (1)$$

where E: beam vertical resiliency coefficient, I: beam cross-sectional second moment, A: beam cross-sectional area, P: bead density, ω: the number of vibration (the number of vibration of the beam resonated by each of the vibrating modes), and β: constant determined by the boundary conditions.

Figure 6:
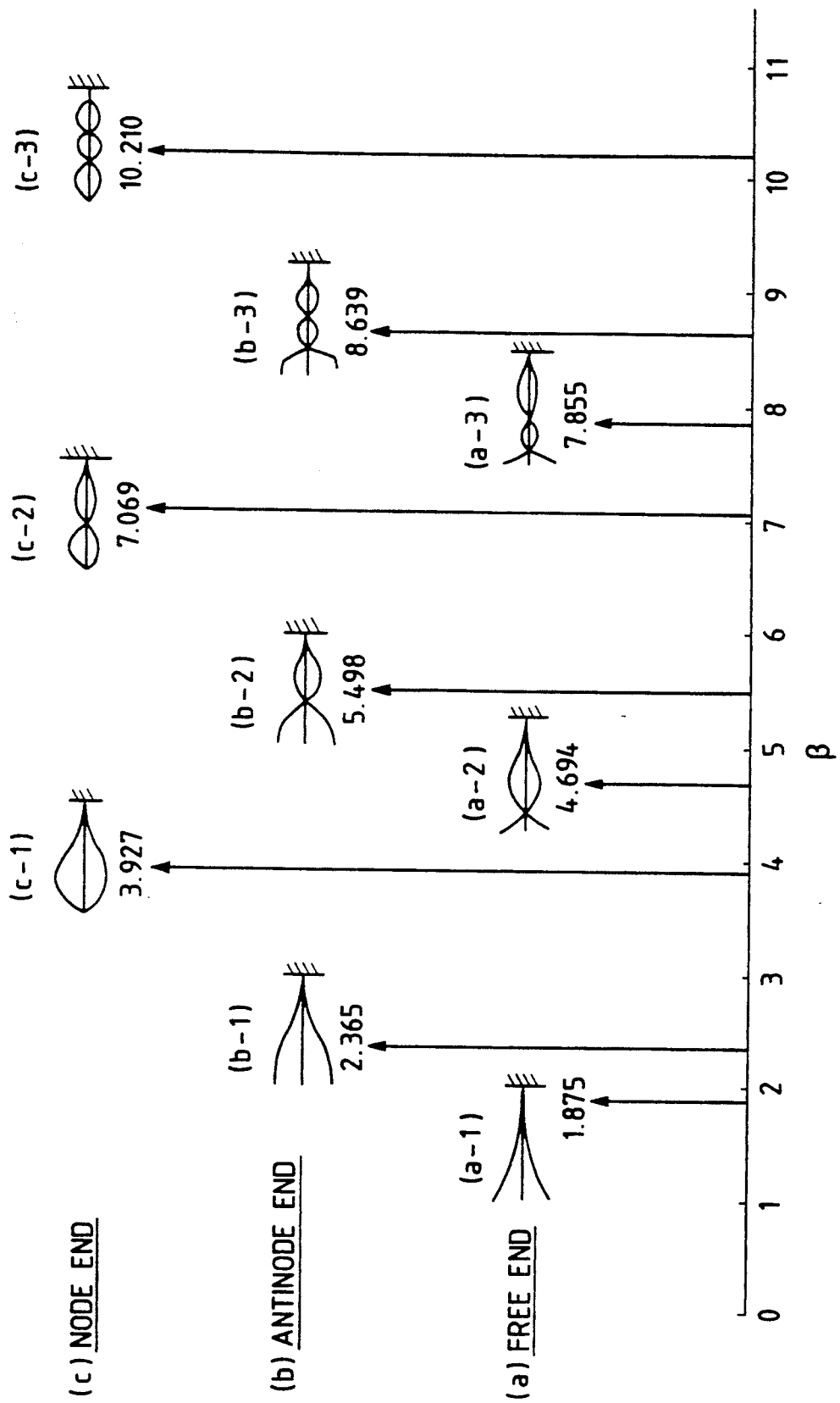
FIG. 6 is a diagram showing the relationship between the beam vibrating mode and $\beta$.

FIG. 6 is a diagram showing the relationships between typical beam vibration modes and constant β. However, in this diagram, the respective cases are shown, in which with one end being fixed (displacement: zero, deflection angle: zero), (a) becomes a free end (bending moment: zero, shearing force: zero); (b) antinode end (deflection angle: zero, shearing force: zero); and (c) become a node end (displacement: zero, bending moment: zero) depending on the boundary conditions of the remaining one end.

These are represented sequentially by (a−1), (a−2), (a−3) . . . from the lower order number in the respective modes.

Figure 7:
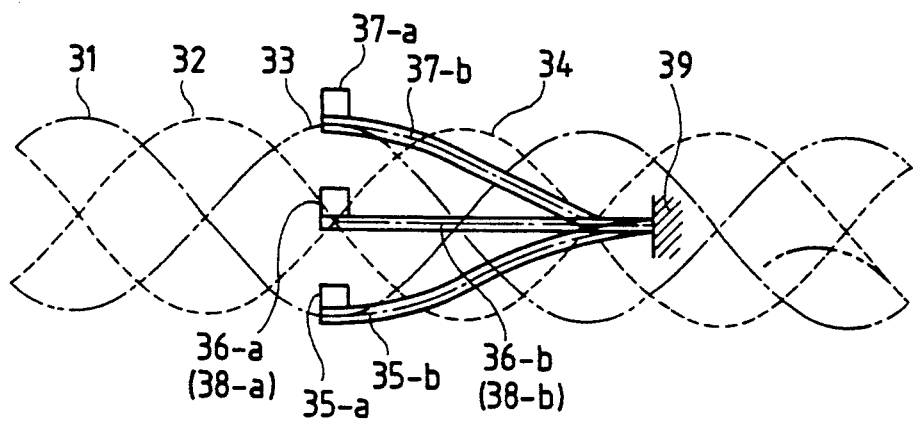
FIG. 7 is a diagram showing the relationship betwen the vibration (displacement) of the supporting member and traveling wave.
Figure 8:
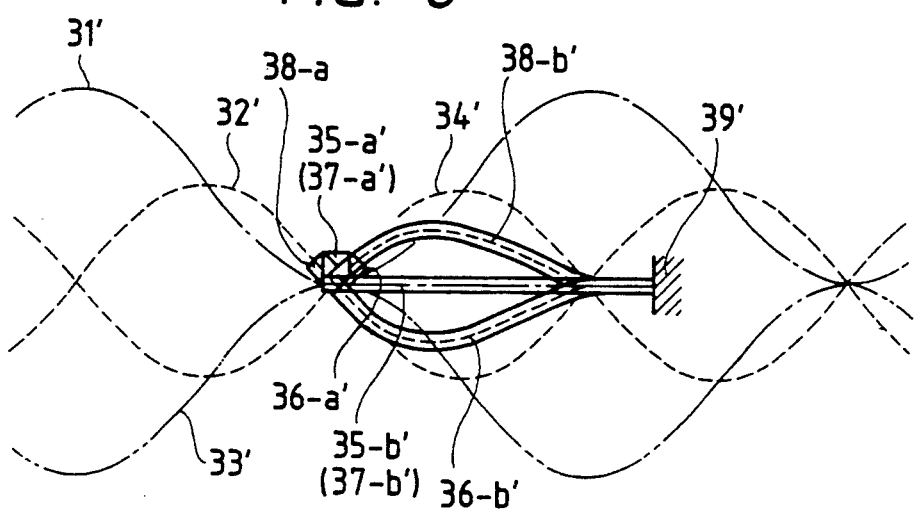
FIG. 8 is a diagram showing the vibration (displacement) of the supporting member and traveling wave.
Figure 9:
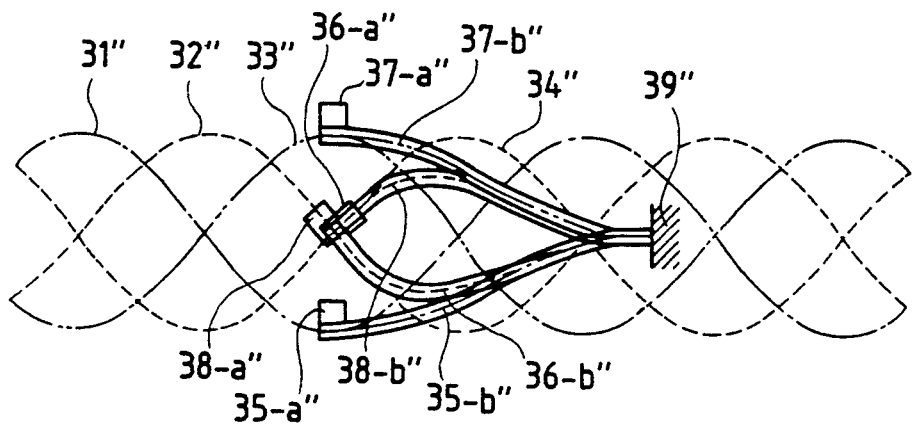
FIG. 9 is a diagram showing the vibration (displacement) of the supporting member and traveling wave.

FIG. 7, FIG. 8, and FIG. 9 are the diagrams each showing the relationship between the vibration (displacement) of the second supporting member 14 and the traveling wave.

Initially, FIG. 7 illustrates the case where the second supporting member 14 becomes an antinode at the coupling position to the vibrating body 1, which represents the case of the lowest mode order indicated by (b−1) in FIG. 6. The traveling wave of the vibrating body 1 is illustrated by the lines of a sinusoidal waveform type, and as its typical examples, the representations are made for phase 0° (dashed line 31), phase 90° (dotted line 32), phase 180° (two-dot chain line 33), and phase 270° (broken line 34). The one end of the second supporting member 14 is shown as the fixed end 39 (corresponding to the fixing portion 11 or 15 in FIG. 3 through FIG. 5).

Reference marks 35-a, 36-a, 37-a, and 38-a designate the positions of the coupling portion 12 to the vibrating body 1 at the phases 0° through 270°; 35-b, 36-b, 37-b, and 38-b, the vibrating modes of the second supporting member 14 at the phases 0° through 270°. In the case of modes shown in FIG. 7, the coupling portion 12 designated by the reference mark 36-a (38-a) does not show any deformation associated with the traveling wave 32 (34). Accordingly, the traveling wave is blocked by the torsional force of the supporting member 14. It is therefore necessary to weaken this torsional force with the torsional deformation of the first supporting member 13 by defining the length $l_1$ of the supporting member 13 as described earlier. In other words, the torsional rigidity of the first supporting member 13 should be reduced.

Now, FIG. 8 illustrates the case where the second supporting member 14 becomes a node at the coupling position to the vibrating body 1, which shows the case of the lowest mode order indicated by (c−1) in FIG. 6. Each portion at the phases 0° through 270° of the traveling wave is the same as shown in FIG. 7 and indicated by the same numbers (marks) with ' (dash). In the case of modes shown in FIG. 8, the deformation of the second supporting member 14 follows the torsional force of the traveling wave at the coupling portion to the vibrating body 1.

However, the traveling wave at each of the phases 31', 32', 33', and 34' is fluctuated vertically because the displacement of the second supporting member 14 is zero at the coupling portion. Accordingly, a vertical vibration is given to the moving member (not shown) which is in contact under pressure with the vibrating body 1 to lower the motor efficiency due to the slipping of the contacting portion or to create a problem of noise generation.

FIG. 9 illustrates the case where the second supporting member 14 is deformed intermediately between the antinode and node at the coupling positions to the vibrating body 1, which represents the vibrating modes indicated by the reference marks (b−1) and (c−1) in FIG. 6, and the affecting degrees of the respective modes, are determined by β. As in the case of FIG. 8, elements represented by the mark " (two prime) have the same functions or lines indicating the same contents. In the case of FIG. 9, it is possible to provide ideal support because the deformation of the second supporting member 14 follows not only the torsion but displacement of the vibrating body 1, i.e., the amplitude of the vibrating body 1, at the coupling portions to the first and second supporting members. In other words, it is unnecessary to reduce the torsional rigidity of the first supporting member 13 as in the case of FIG. 7 for the creation of its torsional deformation. As a result, it becomes possible to make the first supporting member compact.

In the above-mentioned examples, the lowest mode orders are represented. It is clear, however, that the same principle is applicable to the higher mode orders.

Also, it is possible to mainly utilize the static resilient deformation of the second supporting member because the movable member and vibrating body are in contact under pressure. In such a case, it is desirable to adjust the static spring constant $K_0$ by the width of the second supporting member b (refer to FIGS. 2, 3, 5, 10, and 12) to make this static resilient deformation independent from the aforesaid dynamic resilient deformation.

Figure 10:
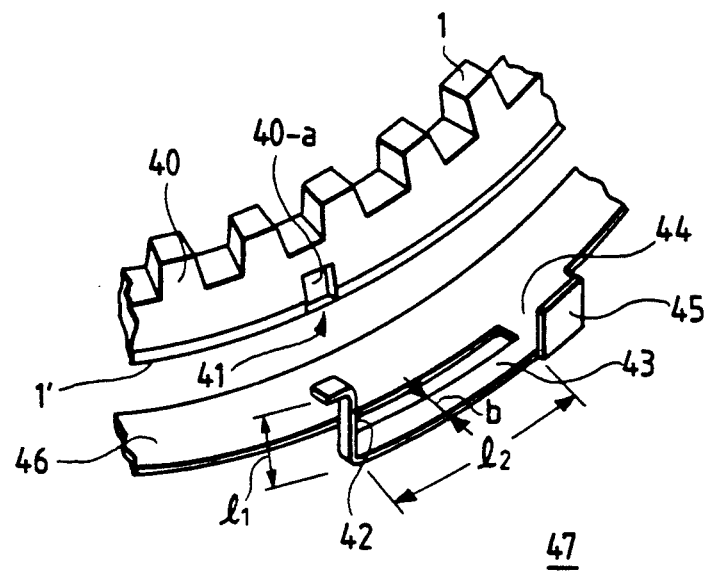
FIG. 10 is a partially enlarged perspective view illustrating a third embodiment of the supporting device according to the present invention.
Figure 11:
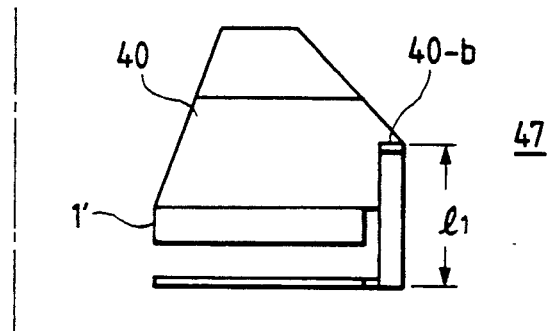
FIG. 11 is a cross-sectional view showing the apparatus shown in FIG. 10.
Figure 12:
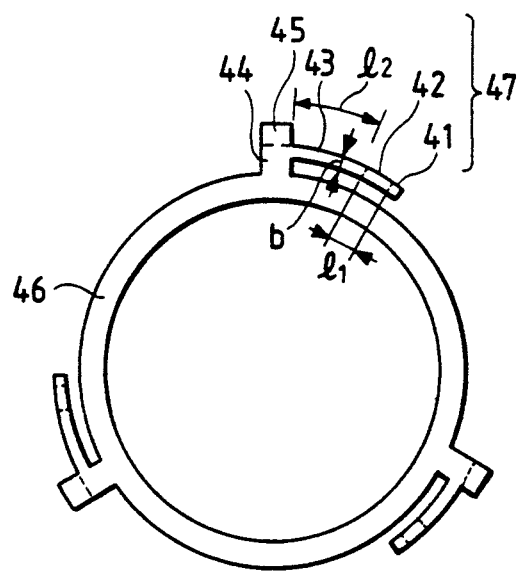
FIG. 12 is a plan view illustrating the supporting member shown in FIG. 10.

FIG. 10 is a partially enlarged view showing a third embodiment. FIG. 11 is a cross-sectional view illustrating the junction of the supporting member and vibrating body. FIG. 12 is a plan view showing the supporting member.

As shown in FIG. 12, a supporting member 47 is produced from a plate by a press or other machining device and formed by bending it at portions indicated by broken lines in FIG. 12. The supporting member 47 is constructed by three sets of a similar member of a circular arc type which are integrally coupled by a base 46. A reference numeral 42 designates a first supporting member; 43, a second supporting member; 44 and 46, fixing portions; and 45, a bending portion for reinforcement.

In the vibrating body 40 having a trapezoidal cross-section, which is of a similar shape to that of the known vibrating body, a groove 40-a is provided for mounting the supporting member, and the coupling portion 41 of the supporting member is fitted thereinto for the junction.

In the present embodiment, the first supporting member 42 is of a shape extending in the thrust direction and is arranged substantially perpendicular to the traveling direction of the traveling wave.

In the above-mentioned structure, each dimension such as $l_1$ and $l_2$ is determined on the basis of the same principle in the second embodiment.

Here, in the above-mentioned embodiment, the vibrating body is supported by the three sets of the supporting member 47, but as its principle shows, the numbers, directions, and combinations thereof are arbitrary. Also, the coupling portions of the vibrating body to the supporting member are not limited to the shape represented in the present embodiment, and the shapes can be of a hole, groove, projection, flange, or other type. Further, its coupling position is not confined to the vicinity of the neutral axis of the peripheral side of the vibrating body. The same effect can be obtained also in the inner side of the periphery or the bottom face of the non-neutral axis (including the plane of the piezoelectric element), projective portion, or bottom face of the groove portion.

Also, the present invention is applicable to a linear type vibration wave driven motor as well as to the ring type motor.

In each of the above-mentioned embodiments, the vibrating body is supported. However, as the traveling waves of the vibrating body are propagated to the movable member (not shown) which is in contact under pressure therewith, it may be possible to apply the same supporting structure as shown in each of the above-embodiments to the coupling portion of the output shafts of the vibrating body and the movable member.

As set forth above, a device for supporting a vibration wave driven motor according to the present invention is provided with a first supporting member which is arranged in the direction essentially perpendicular to the traveling direction of the traveling wave and a second supporting member which is arranged essentially in parallel to the aforesaid traveling direction, and by defining the length of each of them as described earlier, it is possible for them to support the motor reliably without any loss of the vibrating energy as well as to enhance the motor efficiency. Furthermore, the supporting structure can be made small so that the motor is constructed compactly as a whole.

What is claimed is:

1. A vibration wave drive motor comprising:
   a vibration member for generating a traveling wave;
   a first supporting member having a first end portion and a second end portion, said first end portion being coupled to the vibration member, the supporting member being arranged in a direction substantially normal to a traveling direction of said traveling wave, and having a predetermined length, such that a vibration therein follows a torsional displacement of said vibration member caused by said traveling wave; and
   a second supporting member having a first end portion coupled to the second end portion of said first supporting member and a second end portion fixed to a fixing member, said second supporting member being arranged substantially in a traveling direction of said traveling wave, and having a predetermined length, such that a vibration therein follows an amplitude of said traveling wave and a torsion around the axis of said first supporting member in a coupling portion of said first supporting member and said second supporting member.

2. A vibration wave driven apparatus comprising:
   a vibration member for generating a traveling wave;
   a contact member provided in frictional contact with the vibration member and driven by said traveling wave;
   a first supporting member having a first end and a second end, said first end being coupled either to said vibration member or said contact member, and arranged in a direction substantially perpendicular to a traveling direction of said traveling wave, said first supporting member having a predetermined length, such that a vibration therein follows a torsional displacement of said vibration member or said contact member caused by said traveling wave;
   a second supporting member having a first end portion coupled to the second end of said first supporting member and a second end fixed to a fixing member, said second supporting member being arranged substantially in a traveling direction of said traveling wave, and
   having a predetermined length, such that a vibration therein follows an amplitude of said traveling wave and a torsion around the axis of said first supporting member in a coupling portion of said first supporting member and said second supporting member.

3. A vibration wave driven apparatus according to claim 2, wherein said first supporting member and said second supporting member are integrally structured.

4. A vibration wave driven apparatus according to claim 2, wherein a pressure is exerted between said vibrating body and said contacting member by a static resilient deformation of the second supporting member.

5. A vibration wave driven motor comprising:
   a vibration member for generating a traveling wave;
   a first supporting member having a first end portion and a second end portion, said first end portion being coupled to the vibration member, the supporting member being arranged in a direction substantially normal to a direction of said traveling wave; and
   a second supporting member having a first end portion coupled to the second end portion of said first supporting member and a second end portion fixed to a fixing member, said second supporting member being arranged substantially in a traveling direction of said traveling wave, and
   having a predetermined length, such that a vibration therein follows an amplitude of said traveling wave and a torsion around the axis of said first supporting member in a coupling portion of said first supporting member and said second supporting member and a torsional displacement of said vibration member.

6. A vibration wave driven motor comprising:
   a vibration member for generating a traveling wave;
   a first supporting member having a first end portion and a second end portion, said first end portion being coupled to the vibration member, the supporting member being arranged in a direction substantially normal to a direction of said traveling wave; and
   a second supporting member having a first end portion coupled to the second end portion of said first supporting member and a second end portion fixed to a fixing member, said second supporting member being arranged substantially in a traveling direction of said traveling wave.

7. A vibration wave driven apparatus comprising:

a vibration member for generating a traveling wave;

a contact member provided in frictional contact with the vibration member and driven by said traveling wave;

a first supporting member having a first end and a second end, said first end being coupled either to said vibration member or said contact member, said first supporting member being arranged in a direction substantially perpendicular to a traveling direction of said traveling wave;

a second supporting member having a first end portion coupled to the second end of said first supporting member and a second end portion fixed to a fixing member, said second supporting member being arranged substantially in a traveling direction of said traveling wave.

8. A vibration wave driven apparatus according to claim 7, wherein said first supporting member and said second supporting member are integrally structured.

9. A vibration wave driven apparatus according to claim 7, wherein a pressure is exerted between said vibrating member and said contacting member by a static resilient deformation of the second supporting member.

* * * * *

UNITED STATES PATENT AND TRADEMARK OFFICE
CERTIFICATE OF CORRECTION

PATENT NO. : 5,264,753
DATED : Nov. 23, 1993
INVENTOR(S) : Hitoshi Mukohjima, et al.

It is certified that error appears in the above-indentified patent and that said Letters Patent is hereby corrected as shown below:

On title page, item
 [56], "Eigdahl" should read --Engdahl--; "Mukoujima" (both occurrences) should read --Mukohjima--.

COLUMN 1
 Line 32, "i.e." should read --i.e.,--.
 Line 60, "rotate" should read --rotate.--.
 Line 63, "positive" should read --from positive--.
 Line 65, "the" should read --this--.

COLUMN 4
 Line 36, "members" should read --members.--.

COLUMN 5
 Line 10, "bead" should read --beam--; "vibration" should read --vibrations--.
 Line 11, "vibration" should read --vibrations--.
 Line 21, "become" should read --becomes--.
 Line 65, "with ' (dash)." should read --with ' (prime).--.

Signed and Sealed this

Fifth Day of July, 1994

BRUCE LEHMAN

*Attest:*

*Attesting Officer*  *Commissioner of Patents and Trademarks*